(12) United States Patent
Kim et al.

(10) Patent No.: US 12,080,842 B1
(45) Date of Patent: Sep. 3, 2024

(54) LITHIUM SECONDARY BATTERY HAVING HIGH SPECIFIC CAPACITY

(71) Applicant: LG ENERGY SOLUTION, LTD., Seoul (KR)

(72) Inventors: Bong-Soo Kim, Daejeon (KR); Seong-Hyo Park, Daejeon (KR); Sang-Woo Kim, Daejeon (KR); Rin Jang, Daejeon (KR); Jae-Min Hyun, Daejeon (KR)

(73) Assignee: LG ENERGY SOLUTION, LTD. (KR)

( * ) Notice: Subject to any disclaimer, the term of this patent is extended or adjusted under 35 U.S.C. 154(b) by 0 days.

(21) Appl. No.: 18/482,814

(22) Filed: Oct. 6, 2023

(30) Foreign Application Priority Data

May 3, 2023 (KR) ........................ 10-2023-0057999

(51) Int. Cl.
| | |
|---|---|
| *H01M 10/052* | (2010.01) |
| *H01M 4/02* | (2006.01) |
| *H01M 4/36* | (2006.01) |
| *H01M 4/38* | (2006.01) |
| *H01M 4/583* | (2010.01) |
| *H01M 10/0567* | (2010.01) |
| *H01M 10/0569* | (2010.01) |
| *H01M 10/058* | (2010.01) |

(52) U.S. Cl.
CPC ......... *H01M 10/052* (2013.01); *H01M 4/364* (2013.01); *H01M 4/38* (2013.01); *H01M 4/583* (2013.01); *H01M 10/0567* (2013.01); *H01M 10/0569* (2013.01); *H01M 10/058* (2013.01); *H01M 2004/028* (2013.01); *H01M 2300/0037* (2013.01)

(58) Field of Classification Search
CPC ........... H01M 10/052; H01M 10/0567; H01M 10/0569; H01M 10/058; H01M 4/38; H01M 4/583; H01M 2004/028; H01M 2300/0037
See application file for complete search history.

(56) References Cited

U.S. PATENT DOCUMENTS

| | | | |
|---|---|---|---|
| 2002/0045102 | A1 | 4/2002 | Jung et al. |
| 2018/0175375 | A1 | 6/2018 | Lecuyer et al. |
| 2021/0328209 | A1 | 10/2021 | Lee et al. |

FOREIGN PATENT DOCUMENTS

| | | |
|---|---|---|
| CN | 105609742 B | 6/2018 |
| CN | 107069093 B | 4/2020 |
| KR | 1020020011562 A | 2/2002 |
| KR | 1020170003534 A | 1/2017 |
| KR | 1020200060258 A | 5/2020 |
| KR | 10-2021-0088025 A | 7/2021 |
| KR | 20230043495 A | 3/2023 |
| KR | 1020230085616 A | 6/2023 |
| KR | 20230099320 A | 7/2023 |

OTHER PUBLICATIONS

Journal of the Electrochemical Society, Analysis of Polysulfide Dissolved in Electrolyte in Discharge-Charge Process ofLi—S Battery, Yan Diao et al, J. Electrochem. 159 (4) A421-A425 (2012).
Angew. Chem. Int. Ed. 10.1002/anie.201909339(2019), "Challenges and Opportunities towards Practical Lithium-Sulfur Batteries under Lean Electrolyte Conditions", Meng Zhao et al, http://dx.doi.org/10.1002/anie.201909339.
Zhao, M., et al., "Lithium-sulfur batteries under lean electrolyte conditions: challenges and opportunities", Angewandte Chemie International Edition, 2020, 59, 12636-12652.
Nikiforidis et al. "Effective Ways to Stabilize Polysulfide Ions for High-Capacity Li-S Batteries Basedon Organic Chalcogenide Catholytes", ChemElectroChem, vol. 9, No. 18, Jul. 4, 2022, e202200571, 8 pages.
Yang et al. "Structural Design of Lithium-Sulfur Batteries: From Fundamental Research to Practical Application", Electrochemical Energy Reviews, vol. 1, No. 3, Jun. 23, 2018, pp. 239-293, XP055709226, 55 pages.

*Primary Examiner* — Eugenia Wang
(74) *Attorney, Agent, or Firm* — Bryan Cave Leighton Paisner LLP

(57) ABSTRACT

A lithium-sulfur battery having a high capacity and a method for manufacturing the same are provided. The lithium sulfur battery comprises a positive electrode and an electrolyte solution, and has a weight ratio, $W_{SE}/W_{SP}$, of a weight of a sulfur element (S) of a sulfur-based compound present in the electrolyte solution to a weight of a sulfur element (S) of a sulfur-based compound present in the positive electrode of 0.15 or less.

18 Claims, No Drawings

LITHIUM SECONDARY BATTERY HAVING HIGH SPECIFIC CAPACITY

CROSS-REFERENCE TO RELATED APPLICATIONS

This application claims the benefit of and priority to Korean Patent Application No. 10-2023-0057999, filed on May 3, 2023, the disclosures of which are incorporated herein by reference in their entirety.

TECHNICAL FIELD

The present disclosure relates to a lithium secondary battery, and more particularly, to a lithium-sulfur battery having high specific capacity.

BACKGROUND OF THE INVENTION

As the range of application of lithium secondary batteries is extended to not only mobile electronic devices but also electric vehicles (EV) and energy storage systems (ESS), there is a growing demand for lithium secondary batteries with high capacity, high energy density and long life.

Among various types of lithium secondary batteries, lithium-sulfur batteries are a battery system using sulfur-based materials comprising sulfur-sulfur (S—S) bond as the positive electrode active material, and lithium metals, carbon-based materials capable of intercalation/deintercalation of lithium ions, or silicon and tin that can be alloyed with lithium for the negative electrode active material.

In lithium-sulfur batteries, sulfur, the main material of the positive electrode active material has low atomic mass, is very abundant in nature and can be found around the world, is low in cost, and is non-toxic and eco-friendly.

Additionally, lithium-sulfur batteries have theoretical specific capacity (specific capacity) of 1,675 mAh/g by conversion reaction ($S_8+16Li^++16e^-\rightarrow 8Li_2S$) of lithium ion and sulfur at the positive electrode, and when lithium metal is used in the negative electrode, the theoretical energy density is 2,600 Wh/kg. This value is much higher than the theoretical energy density of the other battery systems being studied now (Ni-MH batteries: 450 Wh/kg, Li—FeS batteries: 480 Wh/kg, Li—MnO$_2$ batteries: 1,000 Wh/kg, Na—S batteries: 800 Wh/kg) and lithium ion batteries (250 Wh/kg), so among secondary batteries developed so far, lithium-sulfur batteries are gaining attention as lithium secondary batteries with high capacity, eco-friendliness and low cost.

During discharging, the lithium-sulfur batteries undergo reduction reaction in which sulfur accepts electrons at the positive electrode, and in this instance, lithium polysulfide ($Li_2S_x$, 1<x≤8) is produced at the positive electrode, and some of the lithium polysulfide is easily dissolved in the electrolyte solution, causing side reaction in the batteries and faster degradation of the batteries, and shuttle reaction occurs during charging, resulting in a significant decrease in charge/discharge efficiency. By this reason, the specific capacity of lithium-sulfur batteries developed so far is much lower than the theoretical specific capacity.

Accordingly, there is a need for the development of lithium-sulfur batteries having the specific capacity that is as high as the theoretical specific capacity.

SUMMARY OF THE INVENTION

The present disclosure is designed to solve the above-described problem, and therefore the present disclosure is directed to providing a lithium-sulfur battery having the specific capacity that is as high as the theoretical specific capacity.

The present disclosure is further directed to providing a lithium-sulfur battery with high energy density.

To achieve the above-described objective, according to an aspect of the present disclosure, there is provided a lithium-sulfur battery of the following embodiments.

The lithium-sulfur battery according to a first embodiment comprises an electrode assembly comprising a positive electrode comprising a sulfur-carbon composite, a negative electrode, and a separator between the positive electrode and the negative electrode; and an electrolyte solution, wherein the lithium sulfur battery has a weight ratio of sulfur element (S), $W_{SE}/W_{SP}$, of 0.15 or less:

wherein $W_{SE}$ is a weight of a sulfur element (S) of a sulfur-based compound present in the electrolyte solution, and $W_{SP}$ is a weight of the sulfur element (S) of a sulfur-based compound present in the positive electrode.

The sulfur-based compound present in the electrolyte solution may comprise inorganic sulfur ($S_8$), a lithium (poly)sulfide ($Li_2S_x$, 1≤x≤8), or a mixture thereof, and the sulfur-based compound present in the positive electrode may comprise inorganic sulfur ($S_8$), a lithium (poly)sulfide ($Li_2S_x$, 1≤x≤8), or a mixture thereof.

According to a second embodiment, in the first embodiment, $W_{SE}$ and $W_{SP}$ are measured at a discharge state of 1.7 V to 1.9 V.

In the first or second embodiment, $W_{SE}$ and $W_{SP}$ may be measured at a temperature of 20° C. to 30° C.

In the first or second embodiment, the lithium-sulfur battery may be charged at 0.2 C to 1.0 C before being discharged.

In the second embodiment, the lithium-sulfur battery may be discharged at 0.1 C to 0.5 C to the discharge state of 1.7 V to 1.9 V.

In the first or second embodiment, each of $W_{SE}$ and $W_{SP}$ can be replaced with $W'_{SE}$ and $W'_{SP}$, respectively, wherein $W'_{SE}$ is a weight % of the sulfur element (S) in a sulfur-based compound present in the electrolyte solution based on the total amount of sulfur element (S) in a sulfur-based compound present in the lithium-sulfur battery and $W'_{SP}$ is a weight % of the sulfur element (S) in a sulfur-based compound present in the positive electrode based on the total amount of sulfur element (S) in a sulfur-based compound present in the lithium-sulfur battery. Alternatively, each of $W'_{SE}$ and $W'_{SP}$ may be expressed as weight percent based on the weight of the total sulfur element (S) derived from the total sulfur-based compound added as the positive electrode active material when manufacturing the lithium-sulfur battery.

Since the amount of the total sulfur element (S) derived from the total sulfur-based compound contained in the lithium-sulfur battery, which is the basis for the weight percent of $W'_{SE}$ and $W'_{SP}$, is same, $W'_{SE}/W'_{SP}$ has the same value as $W_{SE}/W_{SP}$.

According to a third embodiment, in the first or second embodiment, the lithium-sulfur battery may satisfy the following Equation 1, $$W'_{SP} > 1.2 \times W'_{SE} + 56.86, \quad \text{[Equation 1]}$$

wherein $W'_{SE}$ is a weight % of sulfur element (S) in a sulfur-based compound present in the electrolyte solution based on the total amount of sulfur element (S) in the lithium-sulfur battery.

W'$_{SP}$ is a weight % of sulfur element (S) in a sulfur-based compound present in the positive electrode based on the total amount of sulfur element (S) in the lithium-sulfur battery.

According to a fourth embodiment, in any one of the first to third embodiments, W$_{SE}$ may be 15 weight % or less based on the total weight of sulfur element (S) in the lithium-sulfur battery.

According to a fifth embodiment, in any one of the first to fourth embodiments, W$_{SP}$ may be 65 weight % or more based on the total weight of sulfur element (S) in the lithium-sulfur battery.

According to a sixth embodiment, in any one of the first to fifth embodiments, W$_{SP}$ may be 75 weight % or more based on the total weight of sulfur element (S) in the lithium-sulfur battery.

According to a seventh embodiment, in any one of the first to sixth embodiments, the sulfur-carbon composite may have a sulfur/carbon weight ratio (S/C weight ratio) of 2.5 g/g or less.

In the seventh embodiment, the sulfur-carbon composite may satisfy the following Equation 2.

$$10.667 \times R_{S/C} - 10.633 > (W_{SE}/W_{SP}) \times 100 \quad \text{[Equation 2]}$$

wherein R$_{S/C}$ is the sulfur/carbon weight ratio (S/C weight ratio).

According to an eighth embodiment, in any one of the first to seventh embodiments, an amount of the sulfur-carbon composite may be 90 weight % or more based on the total weight of the positive electrode.

According to a ninth embodiment, in any one of the first to eighth embodiments, a weight ratio (El/S weight ratio) of the electrolyte solution to the sulfur element in the sulfur-carbon composite may be 3.5 g/g or less.

According to a tenth embodiment, in any one of the first to ninth embodiments, the electrolyte solution may comprise noncyclic ether, cyclic ether or a mixture thereof.

According to an eleventh embodiment, in any one of the first to tenth embodiments, the electrolyte solution may comprise the mixture of the noncyclic ether and the cyclic ether at a volume ratio of 5:95 to 95:5 (v/v).

According to a twelfth embodiment, in any one of the first to eleventh embodiments, the lithium-sulfur battery may have a specific capacity of 60% or more of a theoretical specific capacity calculated from the total amount of the sulfur-based compounds contained in the lithium-sulfur battery.

According to a thirteenth embodiment, in any one of the first to twelfth embodiments, the sulfur-based compound may comprise inorganic sulfur (S$_8$), lithium (poly)sulfide (Li$_2$S$_x$, 1≤x≤8), a disulfide compound, a carbon-sulfur polymer ((C$_2$S$_y$)$_n$, y=2.5 to 50, n≥2), or two or more thereof.

According to a fourteenth embodiment, in any one of the first to thirteenth embodiments, the lithium-sulfur battery may have a specific capacity of 1,000 mAh/g or more.

According to a fifteenth embodiment, in any one of the first to fourteenth embodiments, the lithium-sulfur battery may have an energy density of 300 Wh/kg or more.

According to a sixteenth embodiment, in any one of the first to fifteenth embodiments, the lithium-sulfur battery may be a coin type battery, a pouch type battery or a cylindrical battery.

According to another aspect of the present disclosure, there is provided a method for evaluating a specific capacity of a lithium-sulfur battery.

The method for evaluating the specific capacity of the lithium-sulfur battery according to a seventeenth embodiment is used to evaluate the specific capacity of the lithium-sulfur battery comprising an electrode assembly including a positive electrode comprising a sulfur-carbon composite, a negative electrode, and a separator between the positive electrode and the negative electrode; and an electrolyte solution, and the evaluation method comprises determining the lithium-sulfur battery having a weight ratio of sulfur element (S), W$_{SE}$/W$_{SP}$, of 0.15 or less as a battery with high specific capacity:

wherein W$_{SE}$ is a weight of a sulfur element (S) of a sulfur-based compound present in the electrolyte solution, and W$_{SP}$ is a weight of a sulfur element (S) of a sulfur-based compound present in the positive electrode.

The sulfur-based compound present in the electrolyte solution may comprise inorganic sulfur (S$_8$), a lithium (poly)sulfide (Li$_2$S$_x$, 1≤x≤8), or a mixture thereof, and the sulfur-based compound present in the positive electrode may comprise inorganic sulfur (S$_8$), a lithium (poly)sulfide (Li$_2$S$_x$, 1≤x≤8), or a mixture thereof.

According to an eighteenth embodiment, in the seventeenth embodiment, the battery with high specific capacity, for example, may be a battery having the specific capacity of 1,000 mAh/g or more.

According to further another aspect of the present disclosure, there is provided a method for manufacturing a lithium-sulfur battery.

The method for manufacturing a lithium-sulfur battery according to a nineteenth embodiment comprises: preparing a positive electrode; preparing a negative electrode; disposing a separator between the positive electrode and the negative electrode to form an electrode assembly; accommodating the electrode assembly in a battery housing; injecting an electrolyte solution in the battery housing; sealing the battery housing to form a lithium-sulfur battery; and determining whether the lithium-sulfur battery meets a condition of a weight ratio of sulfur element (S), W$_{SE}$/W$_{SP}$, of 0.15 or less, wherein W$_{SE}$ is a weight of a sulfur element (S) of a sulfur-based compound present in the electrolyte solution, and W$_{SP}$ is a weight of a sulfur element (S) of a sulfur-based compound present in the positive electrode, and the sulfur-based compound present in the electrolyte solution may comprise inorganic sulfur (S$_8$), a lithium sulfide (Li$_2$S), a lithium polysulfide (Li$_2$S$_x$, 1<x≤8), or a mixture thereof, and the sulfur-based compound present in the positive electrode may comprise inorganic sulfur (S$_8$), a lithium (poly)sulfide (Li$_2$S$_x$, 1≤x≤8), or a mixture thereof.

According to a twentieth embodiment, in the nineteenth embodiment, W$_{SE}$ and W$_{SP}$ are measured at a discharge state of 1.7 V to 1.9 V.

In the nineteenth or twentieth embodiment, W$_{SE}$ and W$_{SP}$ may be measured at a temperature of 20° C. to 30° C.

In the nineteenth or twentieth embodiment, the lithium-sulfur battery may be charged at 0.2 C to 1.0 C before being discharged.

In the nineteenth or twentieth embodiment, the lithium-sulfur battery may be discharged at 0.1 C to 0.5 C to the discharge state of 1.7 V to 1.9 V.

According to yet another aspect of the present disclosure, there is provided a lithium-sulfur battery manufactured based on a content ratio of sulfur element (S).

The lithium-sulfur battery according to a twenty first embodiment comprises an electrode assembly comprising a positive electrode including a sulfur-carbon composite, a negative electrode, and a separator between the positive electrode and the negative electrode; and an electrolyte solution, wherein the lithium-sulfur battery is manufactured based on a condition that a weight ratio of sulfur element (S), $W_{SE}/W_{SP}$, is 0.15 or less, $W_{SE}$ is a weight of a sulfur element (S) of a sulfur-based compound present in the electrolyte solution, and $W_{SP}$ is a weight of a sulfur-element (S) of a sulfur-based compound present in the positive electrode, and the sulfur-based compound present in the electrolyte solution may comprise inorganic sulfur ($S_8$), a lithium (poly)sulfide ($Li_2S_x$, 1≤x≤8), or a mixture thereof, and the sulfur-based compound present in the positive electrode may comprise inorganic sulfur ($S_8$), a lithium (poly)sulfide ($Li_2S_x$, 1≤x≤8), or a mixture thereof.

According to a twenty second embodiment, in the twenty first embodiment, $W_{SE}$ and $W_{SP}$ are measured at a discharge state of 1.7 V to 1.9 V.

In the twenty first or twenty second embodiment, the sulfur-carbon composite has a sulfur/carbon weight ratio (S/C weight ratio) of 2.5 g/g or less.

According to an aspect, the lithium-sulfur battery of the present disclosure may have a specific capacity as high as the theoretical specific capacity.

In particular, the lithium-sulfur battery of the present disclosure may have the specific capacity of 1,000 mAh/g or more.

According to an aspect, the lithium-sulfur battery of the present disclosure may have high energy density, for example, 300 Wh/kg or more.

DETAILED DESCRIPTION

Hereinafter, the present disclosure will be described in more detail.

It should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation.

The terminology as used herein is used to describe a specific embodiment and is not intended to limit the present disclosure. The singular form includes the plural form unless the context clearly indicates otherwise. It should be further understood that 'comprise' or 'include' when used in the specification, specifies the presence of stated features, integers, steps, operations, elements, components or a combination thereof, and unless expressly stated otherwise, does not preclude the presence or addition of one or more other functions, integers, steps, operations, elements, components or a combination thereof. The term "comprise" or "include" explicitly states the meaning of "consists of" but is not limited thereto.

The term "composite" as used herein refers to a material with physically • chemically different phases and more effective functions, formed by combining two or more materials.

The term "(poly)sulfide" as used herein is the concept that covers "(poly)sulfide ion ($S_x^{2-}$, 1≤x≤8)" and "lithium (poly)sulfide ($Li_2S_x$ or $Li_2S_x^-$, 1≤x≤8)".

The term "polysulfide" as used herein is the concept that covers "polysulfide ion ($S_x^{2-}$, 1<x≤8)" and "lithium polysulfide ($Li_2S_x$ or $Li_2S_x^-$, 1<x≤8)".

The term "(poly)sulfide" as used herein is the concept that includes "lithium sulfide ($Li_2S$)" and "polysulfide ion ($S_x^{2-}$, 1<x≤8)" and "lithium polysulfide ($Li_2S_x$ or $Li_2S_x^-$, 1<x≤8)".

The unit "$mg_s/cm^2$" as used herein, unless otherwise specified, represents weight of sulfur per unit area, and may be used together with other expressions such as $mg(s)/cm^2$ or $mAh/cm^2$ as a loading amount.

Lithium-sulfur batteries exhibit lower battery capacity than the theoretical capacity due to the elution of lithium (poly)sulfide produced by reduction reaction of sulfur ($S_8$) from the positive electrode into the electrolyte solution during charging • discharging.

According to an aspect of the present disclosure, there is provided a lithium-sulfur battery having high capacity, to be specific, high specific capacity.

The lithium-sulfur battery according to an aspect of the present disclosure comprises an electrode assembly comprising a positive electrode comprising a sulfur-carbon composite, a negative electrode and a separator interposed between the positive electrode and the negative electrode; an electrolyte solution; and a battery housing accommodating the electrode assembly.

In this instance, in the lithium-sulfur battery, a weight ratio of sulfur element (S), $W_{SE}/W_{SP}$, is 0.15 or less.

wherein $W_{SE}$ is the weight of sulfur element (S) in the sulfur-based compound present in the electrolyte solution, and $W_{SP}$ is the weight of sulfur element (S) in the sulfur-based compound present in the positive electrode.

As described above, the lithium-sulfur battery comprises inorganic sulfur ($S_8$) as the positive electrode active material. In the lithium-sulfur battery, lithium (poly)sulfide is produced through reduction reaction at the positive electrode during discharging. When the produced lithium (poly)sulfide is dissolved by the electrolyte solution and eluted into the electrolyte solution from the positive electrode, a smaller amount of lithium (poly)sulfide is oxidized at the positive electrode during charging of the lithium-sulfur battery, resulting in capacity reduction of the lithium-sulfur battery.

The inventors of the present disclosure discovered that a lithium-sulfur battery with a weight ratio of sulfur element (S), $W_{SE}/W_{SP}$, of 0.15 or less can achieve high capacity. In other words, there is an advantageous effect in realizing high capacity when the active material present in the electrolyte solution is maintained below a certain level compared to the active material present in the positive electrode of a lithium-sulfur battery. In order to quantify this effect, the ratio of the weight of sulfur element (S) in the sulfur-based compound present in the electrolyte compared to the weight of sulfur element (S) in the sulfur-based compound present in the positive electrode was used.

Referring to this mechanism, the "sulfur-based compound" as used herein refers collectively to any material containing sulfur (S) derived from the positive electrode active material of the lithium-sulfur battery. The sulfur-based compound may comprise, for example, any sulfur containing compound that may be formed through reduction reaction of inorganic sulfur ($S_8$) or oxidation reaction of lithium sulfide ($Li_2S$), and more specifically, may comprise at least one of inorganic sulfur ($S_8$), lithium polysulfide ($Li_2S_x$, 1<x≤8), disulfide compounds, carbon-sulfur polymer (($C_2S_y$)$_n$, y=2.5 to 50, n≥2) or lithium sulfide ($Li_2S$).

According to an aspect of the present disclosure, a ratio of the amount of sulfur (S) present in the electrolyte solution to the amount of sulfur (S) present in the positive electrode of the lithium-sulfur battery for high specific capacity is newly proposed.

Specifically, according to an aspect of the present disclosure, there is provided the lithium-sulfur battery in which the sulfur (S) weight ratio, $W_{SE}/W_{SP}$, is 0.15 or less.

The sulfur (S) weight ratio, $W_{SE}/W_{SP}$, denotes a ratio of the weight of sulfur (S) in the sulfur-based compound present in the electrolyte solution to the weight of sulfur (S) in the sulfur-based compound present in the positive electrode of the lithium-sulfur battery.

Specifically, there is provided the lithium-sulfur battery with high capacity by controlling $W_{SE}/W_{SP}$ to 0.15 or less.
wherein $W_{SE}$ is the weight of sulfur (S) in the sulfur-based compound present in the electrolyte solution, and
$W_{SP}$ is the weight of sulfur (S) in the sulfur-based compound present in the positive electrode.

In an embodiment of the present disclosure, the lithium-sulfur battery having high specific capacity may have $W_{SE}/W_{SP}$ of 0.15 or less, no matter whether the lithium-sulfur battery is charged or discharged. Preferably, it is necessary to control a ratio of sulfur loss from the positive electrode by the elution of lithium (poly)sulfide produced at the positive electrode during discharging of the lithium-sulfur battery into the electrolyte solution, and $W_{SE}/W_{SP}$ may be 0.15 or less when the lithium-sulfur battery is discharged.

In another embodiment of the present disclosure, the lithium-sulfur battery having high specific capacity may have $W_{SE}/W_{SP}$ of 0.14 or less, 0.13 or less, or 0.12 or less. As $W_{SE}/W_{SP}$ is smaller, the capacity of the lithium-sulfur battery may be higher, and thus the lower limit is not limited to a particular range. For example, $W_{SE}/W_{SP}$ may represent a value of 0.005 or more, 0.01 or more, 0.03 or more, 0.05 or more, 0.07 or more or 0.10 or more in a range satisfying above-described range. In another example, $W_{SE}/W_{SP}$ may be 0.005 to 0.15, 0.01 to 0.14, 0.02 to 0.13, 0.03 to 0.12, 0.04 to 0.125, or 0.05 to 0.12, but the present disclosure is not limited thereto.

Hereinafter, a method for measuring $W_{SE}/W_{SP}$ is described.

In an embodiment of the present disclosure, $W_{SE}/W_{SP}$ may be measured when the lithium-sulfur battery is discharged to 1.7 V to 1.9 V, for example, 1.8 V.

Specifically, $W_{SE}/W_{SP}$ may be measured through a ratio of the weight of sulfur derived from the sulfur-based compound present in the electrolyte solution and the weight of the sulfur-based compound present in the positive electrode after disassembling the lithium-sulfur battery discharged to, for example, 1.7 V to 1.9 V, specifically 1.8 V.

The weight of sulfur (S) in the sulfur-based compound present in the electrolyte solution is '$W_{SE}$', and the weight of sulfur (S) in the sulfur-based compound present in the positive electrode is '$W_{SP}$'.

In an embodiment of the present disclosure, as described above, each of $W_{SE}$ and $W_{SP}$ may be measured after disassembling the lithium-sulfur battery discharged to, for example, 1.7 V to 1.9 V, specifically 1.8 V. It is understood that the state of discharge of 1.7 V to 1.9 V, specifically 1.8 V, reflects the state before the lithium-sulfur battery has been disassembled. Consequently, each of $W_{SE}$ and $W_{SP}$ represents a value which was measured, when the lithium-sulfur battery had been in a state of discharge of 1.7 V to 1.9 V, preferably 1.8 V, before it was disassembled for measuring $W_{SE}$ and $W_{SP}$.

In an embodiment of the present disclosure, the sulfur-based compound present in the electrolyte solution of the lithium-sulfur battery may be eluted and derived from the positive electrode during the operation of the lithium-sulfur battery, and the sulfur-based compound may comprise, for example, inorganic sulfur ($S_8$), lithium sulfide ($Li_2S$), lithium polysulfide ($Li_2S_x$, $1<x\leq8$) or a mixture thereof. Preferably, the sulfur-based compound present in the electrolyte solution is a material that may be dissolved by the electrolyte solution of the lithium-sulfur battery, and may comprise lithium polysulfide ($Li_2S_x$, $1<x\leq8$).

Accordingly, $W_{SE}$ may be the total weight of inorganic sulfur ($S_8$), lithium sulfide ($Li_2S$), lithium polysulfide ($Li_2S_x$, $1<x\leq8$) or a mixture thereof. Preferably, $W_{SE}$ may be the total weight of lithium polysulfide ($Li_2S_x$, $3<x\leq4$), for example $Li_2S_3$, $Li_2S_4$, or a mixture thereof.

$W_{SE}$ does not include the weight of sulfur element (S) from a lithium salt in the electrolyte solution.

$W_{SE}$ may be measured by known methods for measuring the sulfur (S) content in the sulfur-based compound dissolved in the electrolyte solution of the lithium-sulfur battery, or newly developed methods, and the measurement method is not limited to a particular method.

According to an embodiment of the present disclosure, $W_{SE}$ may be measured by the following method.

First, the lithium-sulfur battery to be measured is disassembled to separate positive electrode/separator/negative electrode, and each of the separated positive electrode/separator/negative electrode is put into a container holding a set mass of solvent to extract the sulfur-based compound. In this instance, the extraction of the sulfur-based compound may be preferably, for example, performed for 20 minutes or more, more preferably performed for 20 min. After the extraction, it may be stored in a glovebox. Thus, an extraction solvent of the positive electrode, separator, and negative electrode may be obtained which may be stored separately or may be combined, preferably stored separately. The remaining positive electrode, separator, and negative electrode are stored in the glovebox. The glovebox may be filled with an inert gas, preferably nitrogen or argon gas.

In an embodiment of the present disclosure, the extraction solvent may be analyzed using HPLC after adding a derivatization reagent to, for example, dimethyoxyethane and voltexing the extract of each electrode. In general, the derivatized lithium polysulfide (LiPS) exists as a short chain LiPS ($Li_2S_{3-4}$) and/or a long chain LiPS ($Li_2S_{5-8}$). Data analyzed using HPLC is divided into the derivatized LiPS and inorganic sulfur ($S_8$), and quantitative analysis is conducted using a calibration curve for each concentration of the short chain LiPS and inorganic sulfur having the standards. In the case of the long chain LiPS, the concentration of the stock solution is calculated using the dilution magnification by quantitative analysis of samples obtained through fractionation.

In this instance, a suitable extraction solvent for each sulfur-based compound to be extracted may be used, or a solvent having the same composition as a nonaqueous solvent in the electrolyte solution may be used. When the extraction is completed, each solvent is obtained and analyzed to measure the amount of the sulfur-based compound present in the electrolyte solution, and the sum of them is used to calculate the weight of sulfur (S) in the electrolyte solution. In summary, the weight of sulfur element (S) in the electrolyte solution may be measured by extracting sulfur-based compounds from the positive electrode/separator/negative electrode of the lithium-sulfur battery, derivatizing the sulfur-based compound, for example by the use of dimethyoxyethane, and measuring the amount of the derivatized sulfur-based compounds by quantitative HPLC to obtain the weight of sulfur (S) in the electrolyte solution.

As described below, in this instance, after the extraction, the positive electrode may be dried at room temperature for 1 hour or longer and scraped from the current collector, and then the weight ($W_{SP}$) of sulfur present in the positive electrode may be calculated through elemental analysis.

The method for extracting the sulfur-based compound from the separated electrolyte solution may use, for example, liquid chromatography, but the extraction means is not limited thereto.

In an embodiment, the sulfur-based compound present in the positive electrode of the lithium-sulfur battery may be an input material in the manufacture of the lithium-sulfur battery and may comprise inorganic sulfur ($S_8$).

In an embodiment of the present disclosure, the sulfur-based compound present in the positive electrode of the lithium-sulfur battery may be an input material in the manufacture of the lithium-sulfur battery or a material formed through oxidation and reduction reaction during the operation of the lithium-sulfur battery, and in particular, the sulfur-based compound may comprise inorganic sulfur ($S_8$), lithium (poly)sulfide ($Li_2S_x$, $1 \leq x \leq 8$), or a mixture thereof.

In an embodiment of the present disclosure, as explained below, the $W_{SP}$ is measured after discharging the lithium-sulfur battery, the sulfur-based compound present in the positive electrode may comprise the sulfur-based compound present in the positive electrode at state of discharge of the lithium-sulfur battery. Preferably, the sulfur-based compound present in the positive electrode may comprise lithium (poly)sulfide ($Li_2S_x$, $1 \leq x \leq 8$), more preferably may comprise lithium sulfide ($Li_2S$), lithium polysulfide ($Li_2S_x$, $1 \leq x \leq 3$) or a mixture thereof. More preferably, the sulfur-based compound present in the positive electrode may comprise lithium sulfide ($Li_2S$), lithium polysulfide ($Li_2S_x$, $1 < x \leq 2$) or a mixture thereof. More preferably, the sulfur-based compound present in the positive electrode may comprise lithium sulfide ($Li_2S$), lithium polysulfide ($Li_2S_2$) or a mixture thereof.

In an embodiment of the present disclosure, the $W_{SP}$ may be the total weight of the sulfur-based compound present in the positive electrode, preferably at state of discharge, wherein the sulfur-based compound comprises inorganic sulfur ($S_8$), lithium (poly)sulfide ($Li_2S_x$, $1 < x \leq 8$), or a mixture thereof. Preferably, the $W_{SP}$ may be the total weight of the sulfur-based compound present in the positive electrode, preferably at state of discharge, wherein the sulfur-based compound comprises lithium sulfide ($Li_2S$), lithium polysulfide ($Li_2S_x$, $1 < x \leq 2$) or mixture thereof. More preferably, the $W_{SP}$ may be the total weight of the sulfur-based compound present in the positive electrode, preferably at state of discharge, wherein the sulfur-based compound comprises lithium sulfide ($Li_2S$), lithium polysulfide ($Li_2S_2$), or a mixture thereof.

$W_{SP}$ may be measured by known methods for measuring the amount of sulfur (S) in the sulfur-based compound present in the positive electrode of the lithium-sulfur battery or newly developed methods, and the measurement method is not limited to a particular method.

In an embodiment of the present disclosure, $W_{SP}$ may be acquired by performing elemental analysis on powder obtained by scraping the positive electrode after disassembly/drying from the current collector. In an embodiment of the present disclosure, the analysis may be performed using samples in the absence of nonuniformity by scraping many electrodes from the current collector. For example, the samples may be analyzed using an elemental analyzer combined with pyrolysis, and the element corresponding to inorganic sulfur ($S_8$) may be analyzed through the corresponding analysis method. The method for analyzing the amount of the inorganic sulfur ($S_8$) is not limited to a particular means and method, and may include any analysis method exclusive of elements that form compounds with sulfur (S) other than inorganic sulfur ($S_8$) present in the positive electrode. In this instance, the analysis method for analyzing the sulfur (S) content may be performed on all the elements other than sulfur (S), and is based on weight % of sulfur (S) that forms mass balance with all the analyzed elements.

In an embodiment of the present disclosure, $W_{SP}$ may be measured by disassembling the lithium-sulfur battery to be measured as described above in $W_{SE}$ measurement method, separating the positive electrode/the separator/the negative electrode, extracting the sulfur-based compound present in the electrolyte solution from the separated positive electrode, drying at room temperature for 1 hour or longer, preferably 1 hour, and performing elemental analysis of powder obtained by scraping the active material layer from the current collector.

Thus, in one embodiment, the weight ($W_{SP}$) of sulfur present in the positive electrode may represent sulfur (S) which was not extracted by the use of a solvent for extracting sulfur-based compounds to measure the amount of the weight of sulfur present in the electrolyte solution as it has been described above. In other words, the weight ($W_{SP}$) of sulfur present in the positive electrode may represent sulfur compounds that are not extractable within 20 minutes or more, preferably 20 minutes, in a solvent. From the dried positive electrode obtained after 1 hour or longer, preferably 1 hour, the current collector was fully scraped to obtain sulfur (S) which may be included in a mixture from the positive electrode. The weight of the so obtained mixture including sulfur (S) has been measured and elemental analysis has been performed to obtain the weight ($W_{SP}$) of sulfur present in the positive electrode. Thus, in a special embodiment, the weight ($W_{SP}$) of sulfur present in the positive electrode may be based on the lithium-sulfur battery.

In a further embodiment, the sulfur (S) content in the negative electrode may be measured through elemental analysis. Thus, after disassembling the lithium-sulfur battery, and extracting the sulfur-based compound that are extractable with a solvent from the negative electrode as it is outlined above for determining the weight ($W_{SE}$) of sulfur present in the electrolyte solution, the negative electrode may be dried, and the weight of sulfur present in the negative electrode may be measured via elemental analysis. The weight of sulfur present in the negative electrode in the negative electrode may be around 0, preferably 0, when manufacturing the lithium-sulfur battery or immediately after the manufacture.

In a further embodiment, the sulfur (S) content in the separator may be around 0, preferably 0, measured by elemental analysis. For measuring the sulfur (S) content in the separator, the separator may be prepared by first disassembling the lithium sulfur battery, and extracting the sulfur-based compounds with a solvent as mentioned above for obtaining the electrolyte solution. The separator may be subsequently dried and then the sulfur (S) content in the separator may be measured. Without being bound by any theory, the separator may not chemically react with sulfur, especially sulfur-based compounds, especially sulfur-based compounds originating from the sulfur-carbon composite of the positive electrode, so that sulfur (S) may not be chemically bound to the separator. Sulfur-based compounds which may be on the separator or in the pores of the separator may be fully removed when extracted with a solvent to obtain an electrolyte solution as it is described above.

In an embodiment of the present disclosure, elemental analysis may be performed, for example, using Ion chromatography (IC) analysis, Inductively Coupled Plasma Optical Emission Spectrometer (ICP-OES) analysis, Elemental Analyzer (EA) analysis, ONH analysis or the like, but the elemental analysis method is not limited thereto.

In one embodiment of the present invention, the content of the sulfur-based compound present in the electrolyte of the lithium-sulfur battery may be measured, for example, according to the method described in Korean Patent Application No. 2021-0188588, but the present invention is not limited to it.

In one embodiment of the present invention, the content of the sulfur-based compound present in the positive electrode of the lithium-sulfur battery may be measured, for example, according to the method described in Korean Patent Application No. 2021-0173961, but the present invention is not limited to it.

In an embodiment of the present disclosure, the sulfur weight ratio may be derived using $W_{SE}$ and $W_{SP}$ values measured as described above.

In one embodiment of the present invention, the range of each of $W_{SE}$ and $W_{SP}$ values may vary depending on the size of the lithium-sulfur battery, the loading amount of sulfur in the anode, etc.

However, each of $W_{SE}$ and $W_{SP}$ values may be expressed in weight percent based on the weight of total sulfur element (S) derived from the total sulfur-based compounds contained in the lithium-sulfur battery. Alternatively, it may be expressed as weight percent based on the weight of the total sulfur element (S) derived from the total sulfur-based compound added as the positive electrode active material when manufacturing the lithium-sulfur battery.

In other words, depending on the measurement method, the sulfur weight ratio may be $W'_{SE}/W'_{SP}$, wherein $W'_{SE}$ is a weight % of the sulfur element (S) in a sulfur-based compound present in the electrolyte solution based on the total amount of sulfur (S) among a sulfur-based compound present in the lithium-sulfur battery, and $W'_{SP}$ is a weight % of the sulfur element (S) in a sulfur-based compound present in the positive electrode based on the total amount of sulfur (S) among a sulfur-based compound present in the lithium-sulfur battery. However, since the amount of the total sulfur element (S) derived from the total sulfur based compound contained in the lithium-sulfur battery, which is the basis for the weight percent of $W'_{SE}$ and $W'_{SP}$, is same, $W'_{SE}/W'_{SP}$ value has the same value as $W_{SE}/W_{SP}$.

In a further embodiment, the lithium-sulfur battery may have a sulfur weight ratio calculated from weight %, $W'_{SE}/W'_{SP}$, of 0.15 or less.

In an embodiment of the present disclosure, $W'_{SE}$ may be 15 weight % or less based on the total sulfur (S) weight in the lithium-sulfur battery. For example, $W'_{SE}$ may be 1 weight % to 15 weight %, 1 weight % to 10 weight %, 2 weight % to 9.5 weight %, 3 weight % to 9.5 weight %, 5 weight % to 9.5 weight %, or 7 weight % to 9 weight % based on the total sulfur (S) weight in the lithium-sulfur battery, but is not limited thereto.

In an embodiment of the present disclosure, $W'_{SP}$ may be 65 weight % or more based on the total sulfur (S) weight in the lithium-sulfur battery. In another embodiment of the present disclosure, $W'_{SP}$ may be 75 weight % or more based on the total sulfur (S) weight in the lithium-sulfur battery. In another embodiment of the present disclosure, $W'_{SP}$ may be 75.5 weight % or more based on the total sulfur (S) weight in the lithium-sulfur battery. For example, $W'_{SP}$ may be 65 weight % to 99 weight %, 70 weight % to 98 weight %, 75 weight % to 95 weight %, 75 weight % to 90 weight %, 75 weight % to 85 weight %, 75 weight % to 80 weight % or 75.5 weight % to 80 weight % based on the total sulfur (S) weight in the lithium-sulfur battery, but is not limited thereto.

In an embodiment of the present disclosure, the total sulfur (S) weight in the lithium-sulfur battery refers to the weight of sulfur (S) contained in the positive electrode, the negative electrode, the electrolyte solution and the separator of the lithium-sulfur battery.

In an embodiment of the present disclosure, the total sulfur (S) weight in the lithium-sulfur battery may be measured by separating each of the positive electrode, the negative electrode, the electrolyte solution and the separator included in the lithium-sulfur battery, extracting the sulfur-based compound present in each of the positive electrode, the negative electrode, the electrolyte solution and the separator, measuring the amount of sulfur present in the extracted sulfur-based compound, and summing up the measured amounts. In other words, the weight of the sulfur element (S) in sulfur-based compound present in the electrolyte solution, the weight of the sulfur element (S) in a sulfur-based compound present in the positive electrode, the weight of the sulfur element (S) in a sulfur-based compound present in the negative electrode, and the weight of the sulfur element (S) in a sulfur-based compound present in the negative electrode, may be summed up to obtain the total amount of sulfur element (S) in a sulfur-based compound present in the lithium-sulfur battery.

In another embodiment of the present disclosure, the total sulfur (S) contained in the lithium-sulfur battery may be preferably derived from the sulfur-based compound used as the positive electrode active material when manufacturing the lithium-sulfur battery. Accordingly, the total sulfur (S) weight in the lithium-sulfur battery may be equal to the sulfur (S) content in the input sulfur-based compound used in the positive electrode when manufacturing the lithium-sulfur battery or immediately after the manufacture.

In another embodiment of the present disclosure, the weight of sulfur (S) contained in the negative electrode and the separator of the lithium-sulfur battery may be 0, especially after extracting the sulfur-based compounds with a solvent as it is described above, especially when the lithium-sulfur battery is manufactured or immediately after the manufacture. Thus, when the lithium-sulfur battery is manufactured or immediately after the manufacture of the lithium-sulfur battery, the weight % of sulfur (S) contained in the positive electrode may be equivalent to the weight of sulfur (S) contained in the positive electrode divided by the sum of the weight of sulfur (S) contained in the positive electrode and weight of sulfur (S) contained in the electrolyte solution, and the weight % of sulfur (S) contained in the electrolyte solution may be equivalent to the weight of sulfur (S) contained in the electrolyte solution divided by the sum of the weight of sulfur (S) contained in the positive electrode and weight of sulfur (S) contained in the electrolyte solution.

In one embodiment, the sulfur weight ratio may be about the same when calculated from the weight of sulfur (S) contained in the electrolyte solution and the weight of sulfur (S) contained in the positive electrode, as when the sulfur weight ratio is calculated from the weight % of sulfur (S) contained in the electrolyte solution based on the total sulfur (S) weight in the lithium-sulfur battery and the weight of sulfur (S) contained in the positive electrode based on the total sulfur (S) weight in the lithium-sulfur battery, especially when the lithium-sulfur battery is manufactured or immediately after the manufacture.

In another embodiment, the sulfur weight ratio may be different when calculated from the weight of sulfur (S)

contained in the electrolyte solution and the weight of sulfur (S) contained in the positive electrode, compared to when the sulfur weight ratio is calculated from the weight % of sulfur (S) contained in the electrolyte solution based on the total sulfur (S) weight in the lithium-sulfur battery and the weight % of sulfur (S) contained in the positive electrode based on the total sulfur (S) weight in the lithium-sulfur battery, especially when the lithium-sulfur battery has begun to age so that the negative electrode and the electrolyte may contain sulfur-based compounds which may not be extracted by the solvent as it is disclosed above. In a preferred embodiment, the sulfur weight ratio is measured and calculated when the lithium-sulfur battery is manufactured or immediately after the manufacture.

In one embodiment, a manufactured lithium-sulfur battery may be charged and discharged for 0 cycles, so that the just manufactured lithium-sulfur battery has not been used yet.

In one embodiment, immediately after the manufacture of the lithium-sulfur battery may be less than 10, preferably less than 5, more preferably less than 2, even more preferably 1, charge and discharge cycles of the lithium-sulfur battery.

In one embodiment of the present disclosure, the sulfur weight ratio $W_{SE}/W_{SP}$ may be measured immediately after manufacturing the lithium-sulfur battery, but may also be measured based on a battery when aged after one or more charging and discharging cycles. As a lithium-sulfur battery which meets $W_{SE}/W_{SP}$ value of 0.15 or less provides excellent effects in terms of specific capacity and/or energy density, there is no particular limitation on the timing of measurement of $W_{SE}/W_{SP}$.

The sulfur-based compound may be originated by the positive electrode active material, preferably the sulfur-carbon composite, contained in the positive electrode. The sulfur-based compound may not be originated by the electrolyte, which may contain sulfur-based lithium salts, such as $CF_3SO_3$, $CH_3SO_3Li$, $CF_3SO_3Li$, $(CF_3SO_2)_2NLi$, $(C_2F_5SO_2)_2NLi$, $(SO_2F)_2NLi$, $(CF_3SO_2)_3CLi$, especially $(CF_3SO_2)_2NLi$ (LiTFSI). Thus, sulfur-based lithium salts which may originate from the electrolyte, may not be included as a sulfur-based compound according to the present disclosure. In one embodiment, sulfur-based lithium salts originating from the electrolyte may not react with the positive electrode, negative electrode and separator. The sulfur-based compound originated from the positive electrode material may be different from a sulfur-based lithium salt by the known methods of the skilled person in the art, preferably by HPLC. During an extraction process with a solvent as it is disclosed above, the lithium salt, e.g., LiTFSI, which is contained in the electrolyte, may not be derivatized with the reagent that is used for derivatizing the sulfur-based compound originating from the positive electrode as it is disclosed above. Consequently, the sulfur-based lithium salt may be distinguished from the sulfur-based compound originated from the positive electrode, e.g., sulfur-carbon composite, which may be measured by HPLC. After extracting the sulfur-based compounds from the positive electrode, negative electrode and the separator, they may not contain any lithium salt, e.g., sulfur-based lithium salt, anymore, which was originally contained in the electrolyte.

In one embodiment, $W_{SE}$ and $W_{SP}$ satisfy the following Equation 1:

$$W'_{SP} > 1.2 \times W'_{SE} + 56.86, \quad \text{[Equation 1]}$$

wherein $W'_{SE}$ is the weight % of the sulfur (S) in a sulfur-based compound present in the electrolyte solution based on the total amount of sulfur (S) in the lithium-sulfur battery, and $W'_{SP}$ is the weight % of the sulfur (S) in a sulfur-based compound present in the positive electrode based on the total amount of sulfur (S) in the lithium-sulfur battery.

In one embodiment of the present disclosure, it has been surprisingly found that a lithium-sulfur battery satisfying Equation 1 may provide an enhanced specific energy capacity and energy density.

In an embodiment of the present disclosure, as described above, each of $W'_{SE}$ and $W'_{SP}$ may be measured after disassembling the lithium-sulfur battery discharged to, for example, 1.7 V to 1.9 V, specifically 1.8 V. Thus, it is understood that state of discharge of 1.7 V to 1.9 V, specifically 1.8 V, reflects the state before the lithium-sulfur battery has been disassembled. Consequently, each of $W'_{SE}$ and $W'_{SP}$ in the Equation 1 represents a value measured, when the lithium-sulfur battery has been in a state of discharge of 1.7 V to 1.9 V, preferably 1.8 V, directly before it was disassembled for measuring $W'_{SE}$ and $W'_{SP}$. The definition for $W_{SE}$ and $W_{SP}$ as it is defined above for the sulfur weight ratio may also apply for Equation 1.

In an embodiment of the present disclosure, the total sulfur (S) weight in the lithium-sulfur battery may refer to the sum of sulfur (S) content in inorganic sulfur ($S_8$), lithium polysulfide ($Li_2S_x$, $1 < x \leq 8$), disulfide compounds, carbon-sulfur polymer (($C_2S_y)_n$, $y=2.5$ to 50, $n \geq 2$) and lithium sulfide ($Li_2S$) present in each of the positive electrode, the negative electrode, the electrolyte solution and the separator included in the lithium-sulfur battery.

In an embodiment of the present disclosure, the total sulfur (S) weight in the lithium-sulfur battery may refer to the weight of sulfur (S) calculated from the amount of inorganic sulfur ($S_8$) added as the positive electrode active material when manufacturing the lithium-sulfur battery.

Subsequently, each component of the lithium-sulfur battery will be described in detail.

Positive Electrode

In an embodiment of the present disclosure, the positive electrode may comprise a positive electrode current collector and a positive electrode active material layer coated on one or two surfaces of the positive electrode current collector.

The positive electrode current collector is not limited to a particular type and may include those which support the positive electrode active material, and have high conductivity without causing a chemical change to the battery. For example, the positive electrode current collector may include copper, stainless steel, aluminum, nickel, titanium, palladium, sintered carbon or copper or stainless steel treated with carbon, nickel or silver on the surface, and an aluminum-cadmium alloy.

The positive electrode current collector may have micro-texture on the surface to enhance the bonding strength with the positive electrode active material, and may come in various forms, for example, a film, a sheet, a foil, a mesh, a net, a porous body, a foam and a nonwoven.

The positive electrode active material layer comprises the positive electrode active material, and may further comprise a conductive material, a binder and an additive.

In an embodiment of the present disclosure, the positive electrode active material comprises the sulfur-carbon composite.

In an embodiment of the present disclosure, the sulfur-carbon composite may comprise a porous carbon material; and a sulfur-based compound loaded onto at least one of the inside of the pores of the porous carbon material or the outer surface of the porous carbon material. Since sulfur used as the positive electrode active material does not have electrical conductivity itself, sulfur may be used in combination with a conductive material such as a carbon material, and the porous carbon material may be used as a sulfur host. Additionally, the sulfur-based compound may be added as the positive electrode active material, and may comprise, for example, at least one of inorganic sulfur ($S_8$), lithium polysulfide ($Li_2S_x$, $1<x\leq 8$), disulfide compounds, carbon-sulfur polymer ($(C_2S_y)_n$, $y=2.5$ to $50$, $n\geq 2$) or lithium sulfide ($Li_2S$). Preferably, the sulfur-based compound may comprise inorganic sulfur ($S_8$).

In an embodiment of the present disclosure, the porous carbon material is not limited to a particular type and may include any type of porous carbon material that can load the sulfur-based compound as the positive electrode active material, provide the skeleton for immobilizing the sulfur-based compound uniformly and stably, and improve the conductivity of the positive electrode.

In general, the porous carbon material may be manufactured by carbonizing precursors of various carbon materials. The porous carbon material may include irregular pores. The average diameter of the pores may be in a range between 1 and 200 nm, and the porosity may be in a range between 10 and 90 volume % of the total volume of the porous carbon material. In case that the average diameter of the pores is less than the above-described range, the pore size is at molecular level, which makes sulfur infiltration impossible, and on the contrary, in case that the average diameter of the pores is beyond the above-described range, the porous carbon material has low mechanical strength, which is unfavorable to use in the electrode manufacturing process.

In an embodiment of the present disclosure, the 'average diameter of the pores' may be measured by known methods for measuring the pore diameter of porous materials, and the measurement method is not limited to a particular method. For example, the pore diameter may be measured by scanning electron microscopy (SEM), field emission electron microscopy (FEM), the laser diffraction method or the Brunauer-Emmett-Teller (BET) method. The measurement using the laser diffraction method may use, for example, commercially available laser diffraction particle size measurement machine (for example Microtrac MT 3000). Additionally, the measurement by the BET method may, for example, use BEL Japan's BELSORP series analyzer, but is not limited thereto.

In an embodiment of the present disclosure, the 'porosity' refers to a fraction of voids in a structure over the total volume and is indicated in %, and may be used interchangeably with void fraction, degree of porosity or the like. In the present disclosure, the porosity measurement is not limited to a particular method, and according to an embodiment of the present disclosure, for example, the porosity may be measured by the BET method using nitrogen gas or Hg porosimeter and ASTM D2873.

The shape of the porous carbon material may be spherical, rod-like, needle-like, platy, tubular or bulky, and may include, without limitation, any shape commonly used in the lithium-sulfur battery.

The porous carbon material may include any carbon material having a porous structure or a high specific surface area commonly used in the corresponding technical field. For example, the porous carbon material may include at least one selected from the group consisting of graphite; graphene; carbon black including denka black, acetylene black, ketjen black, channel black, furnace black, lamp black, thermal black; carbon nanotubes (CNT) including single-walled carbon nanotubes (SWCNT) and multi-walled carbon nanotubes (MWCNT); carbon fibers including graphite nanofibers (GNF), carbon nanofibers (CNF) and activated carbon fibers (ACF); graphite including natural graphite, artificial graphite, expandable graphite and activated carbon, but is not limited thereto. Preferably, the porous carbon material may be carbon nanotubes.

In an embodiment of the present disclosure, the porous carbon material may comprise, for example, carbon nanotubes (CNT).

In an embodiment of the present disclosure, the porous carbon material may be prepared by a manufacturing method including a step of centrifugally milling a porous carbon material; and a step of filtering the centrifugally milled porous carbon material through a sieve, wherein a mesh size of the sieve is 2.8 to 4 times of a target $D_{50}$ particle size of the porous carbon material.

In an embodiment of the present disclosure, the porous carbon material may satisfy one or more of the following conditions: (1) a sum of particle size $D_{10}$ and particle size $D_{90}$ is 60 μm or less; and (2) a broadness factor (BF) according to the following Equation 3 is 0.7 or lower:

$$\text{Broadness factor (BF)} = (D_{90} \text{ particle size of the porous carbon material})/[(D_{10} \text{ particle size of the porous carbon material})\times 10]. \quad \text{[Equation 3]}$$

In an embodiment of the present disclosure, the sulfur-carbon composite may, for example, have a sulfur/carbon weight ratio (S/C weight ratio) of 5 g/g or less, and more specifically 2.5 g/g or less. For example, the sulfur-carbon composite may have the S/C weight ratio of 2.4 g/g. When the S/C ratio of the sulfur-carbon composite is in the above-described range, it may be desirable in terms of the sulfur-carbon composite's ability to transport electrons (conductivity) and electrochemical specific surface area, and for example, the larger surface area of the sulfur-carbon composite may suppress the elution of sulfur from the positive electrode more effectively, but the present disclosure is not limited thereto. The S/C weight ratio may be calculated from the weight of sulfur in gram (g) of the sulfur-carbon composite and from the weight of carbon in gram (g) of the sulfur-carbon composite. Alternatively, the S/C weight ratio may be calculated from the weight % of sulfur based on the total amount of the sulfur-carbon composite and from the weight % of carbon based on the total amount of the sulfur-carbon composite. The sulfur/carbon weight ratio (S/C weight ratio) may be dimensionless.

In a preferred embodiment, the sulfur-carbon composite may have a sulfur/carbon weight ratio (S/C weight ratio) in the range between 0.5 and 2.5, between 1.0 and 2.50, between 1.5 and 2.45, between 2.0 and 2.45, between 2.35 and 2.45. The S/C weight ratio may be obtained from the $S_8$/conductive material, weight ratio, when the lithium-sulfur battery is manufactured, wherein the conductive materials is preferably CNT, as discussed below.

The method for manufacturing the sulfur-carbon composite is not limited to a particular method in the present disclosure and may include methods commonly used in the corresponding technical field. For example, the sulfur-carbon composite may be manufactured by simply mixing the sulfur with the porous carbon material and performing thermal treatment to create a composite.

In addition to the above-described composition, the positive electrode active material may further comprise at least one selected from transition metals, Group IIIA elements, Group IVA elements, sulfur compounds of these elements, or alloys of these elements and sulfur.

The transition metals may comprise Sc, Ti, V, Cr, Mn, Fe, Co, Ni, Cu, Zn, Y, Zr, Nb, Mo, Tc, Ru, Rh, Pd, Os, Ir, Pt, Au or Hg, the Group 13 elements may comprise Al, Ga, In, Ti, and the Group 14 elements may comprise Ge, Sn, Pb.

In one embodiment, the sulfur-carbon composite satisfies the following Equation 2:

$$10.667 \times R_{S/C} - 10.633 > (W_{SE}/W_{SP}) \times 100 \text{ wherein}$$ [Equation 2]

$W_{SE}/W_{SP}$ is the sulfur weight ratio, and $R_{S/C}$ is the sulfur/carbon weight ratio (S/C weight ratio).

It has been surprisingly found that, if a lithium-sulfur battery satisfies Equation 2, the lithium-sulfur battery with improved specific energy capacity and energy density can be provided. $W_{SE}/W_{SP}$ may be the weight ratio of sulfur (S) as defined above. $R_{S/C}$ is the sulfur/carbon weight ratio (S/C weight ratio) as defined above In an embodiment of the present disclosure, the sulfur-carbon composite may be included in an amount of 50 weight % or more based on the total weight of the positive electrode. Specifically, the sulfur-carbon composite may be, for example, included in an amount of 80 weight % or more, 90 weight % or more or 95 weight % or more based on the total weight of the positive electrode active material layer. Specifically, the sulfur-carbon composite may be included in an amount of 80 weight % to 100 weight %, more specifically 85 weight % to 99 weight %, 90 weight % to 99 weight %, 95 weight % to 98 weight % or 95 weight % to 97 weight %, or 96 weight % based on the total weight of the positive electrode active material layer. When the amount of the sulfur-carbon composite is less than the above-described range, the larger amount of the subsidiary material such as the conductive material and the binder and the smaller amount of the sulfur-carbon composite makes it difficult to realize the battery with high capacity and high energy density, and on the contrary, when the amount of the sulfur-carbon composite is above the above-described range, the amount of the conductive material or the binder as described below is relatively insufficient, resulting in degradation of the physical properties of the electrode.

In one embodiment, the positive electrode may have a loading amount of 1.67 mg(s)/cm$^2$ or more, preferably 1.67 mg(s)/cm$^2$ or more and 2.92 mg(s)/cm$^2$ or less, more preferably 1.67 mg(s)/cm$^2$ or more and 2.08 mg(s)/cm$^2$ or less.

In one embodiment, the positive electrode may have a loading amount of 2.0 mAh/cm$^2$ or more, preferably 2.0 mAh/cm$^2$ or more and 3.5 mAh/cm$^2$ or less, more preferably 2.0 mAh/cm$^2$ or more and 2.5 mAh/cm$^2$ or less The conductive material may be a material that serves as a movement pathway of electrons from the current collector to the positive electrode active material by electrically connecting the electrolyte to the positive electrode active material, and may include any material having conductive properties as a constituent component of the electrode that is physically different from carbon contained in the sulfur-carbon composite.

In an embodiment of the present disclosure, the conductive material may include, for example, carbon black such as Super-P, denka black, acetylene black, ketjen black, channel black, furnace black, lamp black, thermal black, carbon black; carbon derivatives such as carbon nanotubes or fullerene; conductive fibers such as carbon fibers or metal fibers; metal powder such as fluorocarbon, aluminum, nickel powder; or conductive polymer such as polyaniline, polythiophene, polyacetylene, polypyrrole, either used alone or in combination.

In an embodiment of the present disclosure, the amount of the conductive material may be 0 to 10 weight %, for example, 1 to 10 weight % based on the total weight of the positive electrode active material. When the amount of the conductive material is less than the above-described range, voltage and capacity reduces due to poor electron transport between the positive electrode active material and the current collector. On the contrary, when the amount of the conductive material is above the above-described range, a ratio of the positive electrode active material decreases, resulting in reduced total energy (amount of electric charge) of the battery, and thus it is desirable to determine an optimal amount in the above-described range.

In an embodiment of the present disclosure, the binder may be used to bind the positive electrode active material to the positive electrode current collector, and connect the positive electrode active material in an organic manner to improve the bonding strength, and may include any binder commonly used in the corresponding technical field.

For example, the binder may include one selected from the group consisting of a fluororesin-based binder including polyvinylidene fluoride-based polymer comprising at least one repeat unit of polyvinylidene fluoride (PVdF), vinylidene fluoride, polytetrafluoroethylene (PTFE) or a mixture thereof; a rubber-based binder including styrene butadiene rubber (SBR), acrylonitrile-butadiene rubber, styrene-isoprene rubber; an acrylic binder; a cellulose-based binder including carboxymethyl cellulose (CMC), starch, hydroxypropyl cellulose, regenerated cellulose; a polyalcohol-based binder; a polyolefin-based binder including polyethylene, polypropylene; a polyimide-based binder; a polyester-based binder; a silane-based binder; a polyacrylic acid-based binder; and a polyacrylonitrile-based binder, or a mixture or a copolymer thereof. In a preferred embodiment, the binder is polyacrylate (PAA).

In an embodiment of the present disclosure, the amount of the binder may be 1 to 10 weight % based on the total weight of the positive electrode active material layer. When the amount of the binder is less than the above-described range, the positive electrode active material and the conductive material may be debonded due to weak physical properties of the positive electrode, and when the amount of the binder is above the above-described range, the lower ratio of the positive electrode active material and the conductive material in the positive electrode may reduce the battery capacity, and thus it is desirable to determine an optimal amount in the above-described range.

In the present disclosure, the method for manufacturing the positive electrode for the lithium secondary battery is not limited to a particular method, and may include methods known to those skilled in the art or a variety of modified methods.

For example, the positive electrode for the lithium secondary battery may be manufactured by preparing a positive electrode slurry composition comprising the above-described composition, and coating the composition on at least one surface of the positive electrode current collector to form the positive electrode active material layer.

The positive electrode slurry composition comprises the above-described positive electrode active material, and may further comprise the binder, the conductive material and a solvent.

The solvent includes any solvent that may uniform disperse the positive electrode active material. The solvent may be preferably an aqueous solvent, for example, water, and in this instance, water may be distilled water, deionized water. The solvent is not limited thereto, and if necessary, may include lower alcohol that easily mixes with water. The lower alcohol may include methanol, ethanol, propanol, isopropanol and butanol, and preferably, they may be used in combination with water.

The solvent may be included in such an amount to ensure a sufficient level of viscosity to facilitate coating, and the amount of the solvent may change depending on the coating method and device.

The positive electrode slurry composition may further comprise a material commonly used to improve the function in the corresponding technical field, if necessary.

For example, the positive electrode slurry composition may further comprise a viscosity adjusting agent, glidant, fillers or the like.

The method for coating the positive electrode slurry composition is not limited to a particular method in the present disclosure, and for example, may include doctor blade, die casting, comma coating, screen printing. Additionally, the positive electrode slurry may be formed on a substrate, and coated on the positive electrode current collector by pressing or lamination.

After the coating, a drying process may be performed to remove the solvent. The drying process may be performed at a sufficient level of temperature and time to remove the solvent, and the conditions may change depending on the type of the solvent and the present disclosure is not limited to a particular condition. For example, a drying method may include drying by warm air, hot air and low humidity air, vacuum drying, and drying by (far)infrared radiation and electron beam radiation. The drying speed is adjusted to remove the solvent as quickly as possible within a speed range for preventing cracking in the positive electrode active material layer or preventing the positive electrode active material layer from being peeled from the positive electrode current collector due to stress concentration.

In addition, after the drying, the current collector may be pressed to increase the density of the positive electrode active material in the positive electrode. The pressing may include mold pressing and roll pressing.

The positive electrode manufactured by the above-described composition and manufacturing method, specifically the positive electrode active material layer may have the porosity of 50 to 80 volume %, specifically 60 to 75 volume %. When the porosity of the positive electrode is less than 50 volume %, due to high filling of the positive electrode slurry composition comprising the positive electrode active material, the conductive material and the binder, it fails to maintain a sufficient quantity of electrolyte for ionic conductivity and/or electrical conductivity in the positive electrode active material, resulting in degradation of the output characteristics or cycling characteristics of the battery, and the problem with overvoltage and discharge capacity reduction of the battery gets worse. On the contrary, when the porosity of the positive electrode is higher than 80 volume %, too high porosity reduces the physical and electrical connection with the current collector, resulting in low adhesion strength and poor reaction, and high electrolyte filling reduces the energy density of the battery, and accordingly the porosity of the positive electrode appropriately adjusted in the above-described range.

Negative Electrode

The negative electrode may comprise a negative electrode current collector and a negative electrode active material layer coated on one or two surfaces of the negative electrode current collector. Alternatively, the negative electrode may be a lithium metal plate or a lithium foil.

The negative electrode current collector is used to support the negative electrode active material layer and is the same as described in the positive electrode current collector.

In addition to the negative electrode active material, the negative electrode active material layer may comprise a conductive material and a binder. In this instance, the conductive material and the binder are the same as described above.

The negative electrode active material may comprise a material capable of reversible intercalation or deintercalation of lithium ($Li^+$), a material that reversibly forms a lithium containing compound by reaction with lithium ion, a lithium metal or a lithium alloy.

The material capable of reversible intercalation or deintercalation of lithium ion ($Li^+$) may be, for example, crystalline carbon, amorphous carbon or a mixture thereof. The material that reversibly forms the lithium containing compound by reaction with lithium ion ($Li^+$) may be, for example, tin oxide, titanium nitrate or silicon. The lithium allow may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

Preferably, the negative electrode active material may be a lithium metal, and specifically, may be in the form of a lithium metal foil or a lithium metal powder.

Separator

The separator may comprise a porous non-conductive or insulating material that separates or insulates the positive electrode from the negative electrode, and allows lithium ion transport between the positive electrode and the negative electrode, and may include any separator commonly used in lithium secondary batteries without limitation. The separator may be a stand-alone member such as a film, and may be a coating layer added to the positive electrode and/or the negative electrode.

Preferably, the separator may have low resistance to electrolyte ion transport and high electrolyte wettability.

In an embodiment of the present disclosure, the separator may comprise a porous substrate, the porous substrate may include any type of porous substrate commonly used in secondary batteries, a porous polymer film may be used alone or in stack, and the separator may include, for example, a nonwoven fabric made of high melting point glass fibers, polyethylene terephthalate fibers or a polyolefin-based porous membrane, but is not limited thereto.

The porous substrate is not limited to a particular material in the present disclosure, and may include any porous substrate commonly used in electrochemical devices. For example, the porous substrate may comprise at least one material selected from the group consisting of polyolefin such as polyethylene, polypropylene, polyester such as polyethylene terephthalate, polybutylene terephthalate, polyamide, polyacetal, polycarbonate, polyimide, polyetheretherketone, polyether sulfone, polyphenylene oxide, polyphenylene sulfide, polyethylene naphthalene, polytetrafluoroethylene, polyvinylidene fluoride, polyvinyl chloride, polyacrylonitrile, cellulose, nylon, poly(p-phenylene benzobisoxazole) and polyarylate.

In an embodiment of the present disclosure, the thickness of the porous substrate is not limited to a particular range, but may be 1 to 100 μm, and preferably 5 to 50 μm. The thickness range of the porous substrate is not limited to the above-described range, but when the thickness is too small below the above-described lower limit, the mechanical properties may degrade, causing damage to the separator during the use of the battery.

In an embodiment of the present disclosure, the average diameter and porosity of the pores present in the porous substrate are also not limited to a particular range, may be 0.001 to 50 μm and 10 to 95 volume %, respectively.

In an embodiment of the present disclosure, the separator may further comprise a porous coating layer on at least one surface of the porous substrate, comprising inorganic particles and a binder.

In an embodiment of the present disclosure, the inorganic particles and the binder included in the porous coating layer are not limited to a particular type and may include those commonly used in the porous coating layer of the separator, and its manufacturing method is not limited to a particular method.

Electrolyte Solution

The electrolyte solution comprises a nonaqueous solvent as a medium for the movement of ions involved in the electrochemical reaction of the lithium-sulfur battery and a lithium salt as an electrolyte.

The electrolyte solution may include, without limitation, any composition used in the lithium secondary battery, specifically the lithium-sulfur battery.

In an embodiment of the present disclosure, the nonaqueous solvent is not limited to a particular type and may include any type of solvent used in the lithium-sulfur battery, and may include, for example, an ether-based solvent, ester, amide, linear carbonate and cyclic carbonate.

In an embodiment of the present disclosure, the ester may include, for example, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, but is not limited thereto.

In an embodiment of the present disclosure, the linear carbonate may typically include, for example, at least one selected from the group consisting of dimethyl carbonate, diethyl carbonate, dipropyl carbonate, ethylmethyl carbonate, methylpropyl carbonate and ethylpropyl carbonate, but is not limited thereto.

In an embodiment of the present disclosure, the cyclic carbonate may include, for example, at least one selected from the group consisting of ethylene carbonate, propylene carbonate, 1,2-butylene carbonate, 2,3-butylene carbonate, 1,2-pentylene carbonate, 2,3-pentylene carbonate, vinylene carbonate, vinylethylene carbonate and their halides. The halides may include, for example, fluoroethylene carbonate, but is not limited thereto.

In an embodiment of the present disclosure, the nonaqueous solvent may comprise an ether-based solvent.

In an embodiment of the present disclosure, the ether-based solvent may be included in an amount of 60 volume % or more, for example, 60 volume % to 100 volume %, 70 volume % to 100 volume %, 80 volume % to 100 volume %, 85 volume % to 100 volume %, 90 volume % to 100 volume % or 95 volume % to 100 volume % based on the total volume of the nonaqueous solvent. When the amount of the ether-based solvent is in the above-described range based on the total volume of the nonaqueous solvent, it may be possible to improve the solubility of the constituents of the electrolyte solution such as the lithium salt, but the present disclosure is not limited thereto.

In an embodiment of the present disclosure, the ether-based the solvent may comprise noncyclic ether, cyclic ether or a mixture thereof.

In an embodiment of the present disclosure, the noncyclic ether may comprise, for example, at least one selected from the group consisting of dimethyl ether, diethyl ether, dipropyl ether, dibutyl ether, diisobutyl ether, ethylmethyl ether, ethylpropyl ether, ethylterbutyl ether, dimethoxymethane, trimethoxymethane, dimethoxyethane, diethoxyethane, dimethoxypropane, diethyleneglycol dimethylether, diethyleneglycol diethylether, triethyleneglycol dimethylether, tetraethyleneglycol dimethylether, ethyleneglycol divinylether, diethyleneglycol divinylether, triethyleneglycol divinylether, dipropylene glycol dimethylene ether, butylene glycol ether, diethyleneglycol ethylmethylether, diethyleneglycol isopropylmethylether, diethyleneglycol butylmethylether, diethyleneglycol terbutylethylether and ethyleneglycol ethylmethylether. Preferably, the noncyclic ether may comprise at least one selected from the group consisting of dimethylether, dimethoxyethane, diethoxyethane, diethyleneglycol dimethylether, triethyleneglycol dimethylether and tetraethyleneglycol dimethylether, and more preferably dimethoxyethane.

In an embodiment of the present disclosure, the cyclic ether may comprise, for example, at least one selected from the group consisting of 2-methylfuran, 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene and isosorbide dimethyl ether. Preferably, the cyclic ether may comprise at least one selected from the group consisting of 2-methylfuran, 1,3-dioxolane, tetrahydrofuran, 2-methyltetrahydrofuran and 2,5-dimethyltetrahydrofuran, and more preferably 2-methylfuran.

In an embodiment of the present disclosure, the nonaqueous solvent may comprise, for example, dimethoxyethane (DME), ethyleneglycol, propyleneglycol or a mixture thereof.

In an embodiment of the present disclosure, the nonaqueous solvent may comprise a mixture of the noncyclic ether and the cyclic ether.

In an embodiment of the present disclosure, the nonaqueous solvent may comprise dimethoxyethane (DME) and 2-methylfuran (2-MeF).

In an embodiment of the present disclosure, a volume ratio (v/v) of the noncyclic ether and the cyclic ether may be 5:95 to 95:5 (v/v), specifically 95:5 to 50:50, and more specifically 90:10 to 70:30, 85:15 to 75:25 or 80:20. In the present disclosure, the volume ratio corresponds to a ratio of "volume % of the noncyclic ether":"volume % of the cyclic ether" in the ether-based solvent.

In an embodiment of the present disclosure, the nonaqueous solvent may not comprise the carbonate-based solvent in terms of the solubility of the electrolyte. Alternatively, the nonaqueous solvent may comprise the carbonate-based solvent in such a very small amount that the carbonate-based solvent does not affect the solubility of the lithium salt, and for example, when the nonaqueous solvent comprises the carbonate-based solvent, the amount of the carbonate-based solvent may be 3 weight % or less, 2 weight % or less, 1 weight % or less, 0.5 weight % or less or 0 weight % (i.e., none) based on the total weight of the electrolyte solution for the lithium secondary battery.

In an embodiment of the present disclosure, the lithium salt is not limited to a particular type and may include those used as electrolytes of lithium secondary batteries. The lithium salt may comprise, for example, at least one of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, lithium chloroborane, lower aliphatic lithium carboxylate, lithium tetraphenylborate or lithium imide.

In an embodiment of the present disclosure, the concentration of the lithium salt may be properly determined in view of ionic conductivity and solubility, and may be, for example, 0.1 to 4M, preferably 0.25 to 2M, more preferably 0.5 to 1.5M, preferably 0.5 to 2M, even more preferably 0.5 to 1.0M. When the concentration of the lithium salt is in the above-described range, it may be possible to ensure suitable ionic conductivity for the operation of the battery or appropriate viscosity of the electrolyte solution, thereby improving mobility of lithium ions and suppressing decomposition reaction of the lithium salt itself, but the present disclosure is not limited thereto.

In an embodiment of the present disclosure, in addition to the lithium salt, the electrolyte solution may further comprise a nitrogen compound to improve the electrical conductivity of the electrolyte solution and increase the life of the lithium-sulfur battery. Specifically, the efficacy of the nitrogen compound is not limited thereto, and for example, the nitrogen compound may suppress the reduction reaction of polysulfide produced during charging/discharge of the lithium-sulfur battery, thereby preventing irreversible consumption of polysulfide, leading to improved performance of the lithium-sulfur battery.

In an embodiment of the present disclosure, the nitrogen compound is not limited to a particular type and may include those which form a stable film on the negative electrode or the lithium metal electrode of the lithium secondary battery, specifically the lithium-sulfur battery and improve the charge • discharge efficiency, and may include, for example, a nitric acid compound, a nitrous acid-based compound or a mixture thereof.

In an embodiment of the present disclosure, the nitrogen compound may be, for example, selected from the group consisting of an inorganic nitric acid or nitrous acid compound such as lithium nitrate (LiNO$_3$), potassium nitrate (KNO$_3$), cesium nitrate (CsNO$_3$), barium nitrate (Ba(NO$_3$)$_2$), ammonium nitrate (NH$_4$NO$_3$), lithium nitrite (LiNO$_2$), potassium nitrite (KNO$_2$), cesium nitrite (CsNO$_2$), ammonium nitrite (NH$_4$NO$_2$); an organic nitric acid or nitrous acid compound such as methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite; an organic nitro compound such as nitromethane, nitropropane, nitrobutane, nitrobenzene, dinitrobenzene, nitro pyridine, dinitro pyridine, nitrotoluene, dinitrotoluene and a combination thereof, and preferably, may comprise, lithium nitrate.

In an embodiment of the present disclosure, the nitrogen compound may be, for example, included in an amount of 1 weight % to 10 weight %, 2 weight % to 10 weight % or 3 weight % to 10 weight %, specifically 3 weight % to 8 weight %, 3 weight % to 6 weight % or 3 weight % to 5 weight % based on the total weight of the electrolyte solution for the lithium secondary battery, but is not limited thereto. When the nitrogen compound is included in the above-described amount, the nitrogen compound may improve the electrical conductivity of the electrolyte solution and suppress the reduction reaction of polysulfide when used in the lithium-sulfur battery, but the present disclosure is not limited thereto.

In an embodiment of the present disclosure, the lithium-sulfur battery may have varying energy density depending on the ratio of the electrolyte solution and the positive electrode active material. The smaller ratio of the electrolyte solution and the positive electrode active material, the higher energy density of the lithium-sulfur battery, and for example, the weight ratio (El/S weight ratio) of the electrolyte solution and sulfur in the sulfur-carbon composite may be 3.5 g/g or less.

In an embodiment of the present disclosure, the lithium-sulfur battery may be, for example, manufactured with the El/S ratio of 3 g/g or less, or 2.9 g or less.

According to an embodiment of the present disclosure, the lithium-sulfur battery of the above-described configuration may have the specific capacity of 60% or more, specifically 65% or more, 70% or more, or 75% or more, compared to the theoretical specific capacity calculated from the total amount of the sulfur-based compound contained in the lithium-sulfur battery. More specifically, the lithium-sulfur battery may have the specific capacity of 80% or more, and further, 90% or more compared to the theoretical specific capacity calculated from the total amount of the sulfur-based compound contained in the lithium-sulfur battery. Lithium-sulfur batteries have theoretical specific capacity (specific capacity) of 1,675 mAh/g by conversion reaction (S$_8$+16Li$^+$+16e$^-$→8Li$_2$S) of lithium ion and sulfur at the positive electrode to which the theoretical specific capacity of the present disclosure refers to.

In an embodiment of the present disclosure, the specific capacity of the lithium-sulfur battery may be, for example, 1,000 mAh/g or more, preferably 1,050 mAh/g or more, more preferably 1,080 mAh/g or more, like in a range between 1,000 mAh/g and 1675 mAh/g, preferably in a range between 1,000 mAh/g and 1300 mAh/g, more preferably in a range between 1050 mAh/g and 1250 mAh/g, even more preferably in a range between 1080 mAh/g and 1150 mAh/g.

In an embodiment of the present disclosure, the energy density of the lithium-sulfur battery may be, for example, 300 Wh/kg or more, like in a range between 300 Wh/kg and 2,600 Wh/kg, preferably in a range between 300 Wh/kg and 1600 Wh/kg, more preferably a range between 300 Wh/kg and 1000 Wh/kg, even more preferably in a range between 300 Wh/kg and 800 Wh/kg, especially more preferably in a range between 300 Wh/kg and 450 Wh/kg, even especially more preferably a range between 330 Wh/kg and 400 Wh/kg.

In an embodiment of the present disclosure, the specific capacity and energy density of the lithium-sulfur battery may be measured by known methods for measuring the specific capacity and energy density of the lithium-sulfur battery, respectively, and the measurement method is not limited to a particular method.

In an embodiment of the present disclosure, the specific capacity and energy density of the lithium-sulfur battery may be, for example, measured by discharging at 0.5 C rate and charging at 0.3 C rate in a range between 1.8 V and 2.5 V at room temperature of 23° C.

In an embodiment of the present disclosure, the lithium-sulfur battery may have various shapes, and for example, coin, pouch type or cylindrical shape, but is not limited thereto.

According to another aspect of the present disclosure, there is provided a method for evaluating the specific capacity of the lithium-sulfur battery using the above said sulfur weight ratio, $W_{SE}/W_{SP}$.

The evaluation method includes the step of determining that the lithium-sulfur battery in which a weight ratio of sulfur (S), $W_{SE}/W_{SP}$, is 0.15 or less as a battery with high specific capacity.

In the evaluation method, $W_{SE}$ does not include the weight of sulfur element (S) from a lithium salt in the electrolyte solution.

In an embodiment of the present disclosure, the battery with high specific capacity may be, for example, a battery having the specific capacity of 1,000 mAh/g or more.

According to further another aspect of the present disclosure, there is provided a method for manufacturing a lithium-sulfur battery comprising the step of determining a weight ratio of sulfur element (S), $W_{SE}/W_{SP}$.

In another embodiment of the present disclosure, the method is to manufacture a lithium-sulfur battery based on determination whether the lithium-sulfur battery meets a condition of $W_{SE}/W_{SP}$ of 0.15 or less.

According to yet another aspect of the present disclosure, there is provided a lithium-sulfur battery manufactured based on a condition of a weight of sulfur element (S), $W_{SE}/W_{SP}$.

In yet another embodiment of the present disclosure, the lithium-sulfur battery is manufactured based on the condition that $W_{SE}/W_{SP}$ is 0.15 or less.

Hereinafter, examples will be described to help an understanding of the present disclosure, but the following examples are provided by way of illustration and it is obvious to those skilled in the art that various changes and modifications may be made thereto within the technical aspect and scope of the present disclosure and such changes and modifications fall within the scope of the appended claims.

Manufacture of Lithium-Sulfur Battery

Example 1

Inorganic sulfur ($S_8$) and carbon nanotubes (CNT) as a positive electrode active material were mixed to prepare a sulfur-carbon composite (S/C weight ratio=2.45), and 96 weight % of the prepared sulfur-carbon composite and 4 weight % of polyacrylate (PAA) as a binder were mixed to prepare a positive electrode slurry composition. The positive electrode slurry composition was coated on an aluminum current collector and dried to manufacture a positive electrode. The loading amount of the manufactured positive electrode was 2.08 mg(s)/cm² (2.5 mAh/cm²).

For a negative electrode, a 60 μm thick lithium metal was used.

The positive electrode and the negative electrode were placed facing each other with a polyethylene separator having the thickness of 16 μm and porosity of 46 vol % interposed between to prepare an electrode assembly.

The prepared electrode assembly was received in a pouch type housing and an electrolyte solution containing 0.75 M lithium salt (LiTFSI) and 3 wt % of lithium nitrate ($LiNO_3$) dissolved in a mixed solvent of dimethoxyethane (DME): 2-methyl furan (2-MeF) at a volume ratio of 8:2 was injected at an El/S ratio of 2.9 g/g to manufacture a lithium-sulfur battery.

Comparative Example 1

A lithium-sulfur battery was manufactured in the same way as example 1 except that the sulfur-carbon composite was prepared at the S/C weight ratio of 2.9.

Comparative Example 2

A lithium-sulfur battery was manufactured in the same way as example 1 except that the sulfur-carbon composite was prepared at the S/C weight ratio of 2.6.

Measurement of Sulfur Weight Ratio and Battery Performance Evaluation

Each of the manufactured lithium-sulfur batteries of example 1 and comparative examples 1 and 2 was charged one time at 0.3 C rate in a range between 1.8 V and 2.5 V at room temperature (23° C.) and discharged one time at 0.5 C rate until 1.8 V, and in this instance, the battery capacity (mAh)) and energy (Wh) was measured and divided by the battery capacity of each battery to evaluate the specific capacity (mAh/g) and energy density (Wh/kg) of the battery, and the evaluation results are shown in the following Table 1.

Subsequently, the lithium-sulfur battery discharged until 1.8V was disassembled to separate the positive electrode and the electrolyte solution, and $W_{SE}/W_{SP}$ was measured.

$W_{SE}$ is the weight of sulfur (S) in the sulfur-based compound present in the electrolyte solution, and $W_{SP}$ is the weight of sulfur(S) in the sulfur-based compound present in the positive electrode.

To measure $W_{SE}$, the decomposed battery was placed in an extraction solvent (DME) and extracted for 48 hours, the battery was removed from the extract, and methyltrifluoromethanesulfonate ($CF_3SO_3CH_3$) was added to the extract to produce methyl derivatization. The methyl-derivatized components were analyzed and separated by LC (liquid chromatography) under the following conditions, and then fractionated according to the fraction range.

[LC/UV Analysis Conditions]

Column: CAPCELLPAL C18 column (inner diameter 4.6 mm, length 50 mm, particle size 3 μm, OSAKA SODA)

Mobile phase: mixed solvent of $H_2O$/methanol, gradient elution (0 min: $H_2O$/methanol 75/25 (v/v), 10 min: $H_2O$/methanol=0/100 (v/v), 20 min: $H_2O$/methanol=0/100 (v/v)

Flow rate: 0.7 ml/min

Column temperature: 40° C.

Injection volume: 10 μl

Detection wavelength: 254 nm

Afterwards, the peak area for each methyl derivatized component shown in the chromatogram obtained by LC/UV analysis was measured using the standard product for each concentration prepared in Korean Patent Application No. 2021-0188588, and the peak area for each methyl derivatized component was measured to determine the concentration present in the extract. After calculating the content of each component of lithium (poly)sulfide, they were added together to measure $W_{SE}$ value.

To measure $W_{SP}$, after drying the decomposed positive electrode after extraction for $W_{SE}$ measurement at room temperature, the content of elemental sulfur (S) in the positive electrode was measured according to the method described in Korean Patent Application No. 2021-0173961. Specifically, the positive electrode active material layer was scraped and placed into a Sn capsule, placed in an EA equipment (Flash 2100, Thermo), and burned at 990° C. to generate gas. The generated gas was separated using a GC column and the content of elemental sulfur (S) was measured. At this time, BBOT (2,5-Bis(5-tert-butyl-benzoxazol-2-yl)thiophene) was used as a standard material for quantitative analysis.

Furthermore, $W'_{SP}$ and $W'_{SE}$ were measured to observe if they satisfy Equation 1:

$$W'_{SP} > 1.2 \times W'_{SE} + 56.86, \quad \text{[Equation 1]}$$

wherein $W'_{SE}$ is the weight % of the sulfur (S) in a sulfur-based compound present in the electrolyte solution based on the total amount of sulfur (S) in the lithium-sulfur battery, and $W'_{SP}$ is the weight % of the sulfur (S) in a sulfur-based compound present in the positive electrode based on the total amount of sulfur (S) in the lithium-sulfur battery.

The total weight amount of the lithium-sulfur battery was based on the amount of sulfur in the sulfur-carbon composite. However, in case the lithium-sulfur battery is not manufactured by oneself, the total amount of sulfur in the lithium-sulfur battery may be alternatively measured by the methods known by a person skilled in the art as it is described above.

The weight % of the sulfur (S) in a sulfur-based compound present in the electrolyte solution was calculated from the weight of the sulfur (S) in a sulfur-based compound in the electrolyte solution divided by the total amount of sulfur in the lithium-sulfur battery.

The weight % of the sulfur (S) in a sulfur-based compound present in the positive electrode was calculated from the weight of the sulfur (S) in a sulfur-based compound in the positive electrode was divided by the total amount of sulfur in the lithium-sulfur battery.

If an example meets Equation 1, it is marked as "T" (true). If an example fails to meet Equation 1, it is marked as "F" (false).

Furthermore, it was experimented that if $W_{SE}$, $W_{SP}$ and $R_{S/C}$ (weight ratio of sulfur-carbon) satisfy Equation 2:

$$10.667 \times R_{S/C} - 10.633 > (W_{SE}/W_{SP}) \times 100 \quad \text{[Equation 2]}$$

wherein $W_{SE}/W_{SP}$ is the weight ratio of sulfur (S), and $R_{S/C}$ is the sulfur/carbon weight ratio (S/C weight ratio).

If an example meets Equation 2, it is marked as "T" (true). If an example fails to meet Equation 2, it is marked as "F" (false).

The following Table 1 shows a weight ratio of each of the measured $W_{SE}$ and $W_{SP}$ based on the total sulfur (S) weight derived from the amount of inorganic sulfur ($S_8$) used when manufacturing the sulfur-carbon composite used in each battery.

examples 1, 2, despite high S/C ratio, comparative example 1 has lower specific capacity and lower energy density than comparative example 2. Accordingly, it was confirmed through $W_{SE}/W_{SP}$ value that the lithium-sulfur battery had high specific capacity. It was also confirmed through Equations 1 and 2 that the lithium-sulfur battery, which fulfilled the conditions of those equations, had high specific capacity.

When the battery is discharged until 1.8V, the reduction reaction of sulfur does not occur any more, and in this instance, the battery exhibits the maximum capacity, and $W_{SE}/W_{SP}$ value is lowest. Accordingly, it was confirmed that it is necessary to control $W_{SE}/W_{SP}$ equal to or below 0.15 to realize the lithium-sulfur battery having high specific capacity and high energy density.

The invention claimed is:

1. A lithium-sulfur battery comprising:
an electrode assembly comprising a positive electrode including a sulfur-carbon composite, a negative electrode, and a separator between the positive electrode and the negative electrode; and
an electrolyte solution,
wherein the lithium sulfur battery has a weight ratio of sulfur element (S), $W_{SE}/W_{SP}$, of 0.15 or less,
wherein $W_{SE}$ is a weight of a sulfur element (S) of a sulfur-based compound present in the electrolyte solution, and
$W_{SP}$ is a weight of a sulfur element (S) of a sulfur-based compound present in the positive electrode, and
wherein the sulfur-based compound present in the electrolyte solution comprises inorganic sulfur ($S_8$), a lithium sulfide ($Li_2S$), a lithium polysulfide ($Li_2S_x$, $1 < x \leq 8$), or a mixture thereof, and the sulfur-based compound present in the positive electrode comprises inorganic sulfur ($S_8$), a lithium sulfide ($Li_2S$), a lithium polysulfide ($Li_2S_x$, $1 < x \leq 8$), or a mixture thereof.

2. The lithium-sulfur battery according to claim 1, wherein $W_{SE}$ and $W_{SP}$ are measured at a discharge state of 1.7 V to 1.9 V.

3. The lithium-sulfur battery according to claim 1, wherein $W_{SE}$ is 15 weight % or less based on the total weight of sulfur element (S) in the lithium-sulfur battery.

4. The lithium-sulfur battery according to claim 1, wherein $W_{SP}$ is 65 weight % or more based on the total weight of sulfur element (S) in the lithium-sulfur battery.

TABLE 1

| | S/C ratio | $W_{SE}$ (mg) | $W_{SP}$ (mg) | $W'_{SE}$ (%) | $W'_{SP}$ (%) | $W_{SE}/W_{SP}$ (%) | Equation 1 | Equation 2 | Specific capacity (mAh/g) | Energy density (Wh/kg) |
|---|---|---|---|---|---|---|---|---|---|---|
| Example 1 | 2.4 | 28 | 237 | 9.1 | 76.8 | 11.9 | T | T | 1,089 | 349 |
| Comparative example 1 | 2.9 | 47 | 232 | 15.2 | 75.1 | 20.3 | F | F | 979 | 312 |
| Comparative example 2 | 2.6 | 38 | 221 | 12.2 | 71.5 | 17.1 | F | F | 875 | 278 |

As can be seen from the above Table 1, in the case of example 1 in which $W_{SE}/W_{SP}$ ratio of the lithium-sulfur battery discharged until 1.8V is 0.15 or less, the S/C ratio was lower than those of comparative examples 1 and 2, the specific capacity was 1,000 mAh/g or more, and high energy density was found. However, when comparing comparative 5. The lithium-sulfur battery according to claim 4, wherein $W_{SP}$ is 75.5 weight % or more based on a total sulfur (S) weight in the lithium-sulfur battery.

6. The lithium-sulfur battery according to claim 1, wherein the sulfur-carbon composite has a sulfur/carbon weight ratio (S/C weight ratio) of 2.5 g/g or less.

7. The lithium-sulfur battery according to claim 1, wherein an amount of the sulfur-carbon composite is 90 weight % or more based on the total weight of the positive electrode.

8. The lithium-sulfur battery according to claim 1, wherein a weight ratio of the electrolyte solution to the sulfur element in the sulfur-carbon composite (El/S weight ratio) is 3.5 g/g or less.

9. The lithium-sulfur battery according to claim 1, wherein the electrolyte solution comprises noncyclic ether, cyclic ether or a mixture thereof.

10. The lithium-sulfur battery according to claim 9, wherein the electrolyte solution comprises the mixture of the noncyclic ether and the cyclic ether at a volume ratio of 5:95 to 95:5 (v/v).

11. The lithium-sulfur battery according to claim 1, wherein the lithium-sulfur battery has a specific capacity of 60% or more of a theoretical specific capacity calculated from the total amount of the sulfur-based compounds contained in the lithium-sulfur battery.

12. The lithium-sulfur battery according to claim 1, wherein the lithium-sulfur battery has a specific capacity of 1,000 mAh/g or more.

13. The lithium-sulfur battery according to claim 1, wherein the lithium-sulfur battery has an energy density of 300 Wh/kg or more.

14. A method for manufacturing a lithium-sulfur battery, the method comprising:
   preparing a positive electrode;
   preparing a negative electrode;
   disposing a separator between the positive electrode and the negative electrode to form an electrode assembly;
   accommodating the electrode assembly in a battery housing;
   injecting an electrolyte solution in the battery housing;
   sealing the battery housing to form a lithium-sulfur battery; and
   determining whether the lithium-sulfur battery meets a condition of a weight ratio of sulfur element (S), $W_{SE}/W_{SP}$, of 0.15 or less,
   wherein $W_{SE}$ is a weight of a sulfur element (S) of a sulfur-based compound present in the electrolyte solution, and $W_{SP}$ is a weight of a sulfur element (S) of a sulfur-based compound present in the positive electrode, and
   wherein the sulfur-based compound present in the electrolyte solution comprises inorganic sulfur ($S_8$), a lithium (poly)sulfide ($Li_2S_x$, $1 \leq x \leq 8$), or a mixture thereof, and the sulfur-based compound present in the positive electrode comprises inorganic sulfur ($S_8$), a lithium (poly)sulfide ($Li_2S_x$, $1 \leq x \leq 8$), or a mixture thereof.

15. The method according to claim 14, wherein $W_{SE}$ and $W_{SP}$ are measured at a discharge state of 1.7 V to 1.9 V.

16. A lithium-sulfur battery comprising:
   an electrode assembly comprising a positive electrode including a sulfur-carbon composite, a negative electrode, and a separator between the positive electrode and the negative electrode; and
   an electrolyte solution,
   wherein the lithium-sulfur battery is manufactured based on a condition that a weight ratio of sulfur element (S), $W_{SE}/W_{SP}$, is 0.15 or less,
   wherein $W_{SE}$ is a weight of a sulfur element (S) of a sulfur-based compound present in the electrolyte solution, and $W_{SP}$ is a weight of a sulfur-element (S) of a sulfur-based compound present in the positive electrode, and
   wherein the sulfur-based compound present in the electrolyte solution comprises inorganic sulfur ($S_8$), a lithium (poly)sulfide ($Li_2S_x$, $1 \leq x \leq 8$), or a mixture thereof, and the sulfur-based compound present in the positive electrode comprises inorganic sulfur ($S_8$), a lithium (poly)sulfide ($Li_2S_x$, $1 \leq x \leq 8$), or a mixture thereof.

17. The lithium-sulfur battery according to claim 16, wherein $W_{SE}$ and $W_{SP}$ are measured at a discharge state of 1.7 V to 1.9 V.

18. The lithium-sulfur battery according to claim 16, wherein the sulfur-carbon composite has a sulfur/carbon weight ratio (S/C weight ratio) of 2.5 g/g or less.

* * * * *